US010255039B2

(12) United States Patent
Gannavarapu et al.

(10) Patent No.: US 10,255,039 B2
(45) Date of Patent: Apr. 9, 2019

(54) DYNAMICALLY DETERMINING RELEVANT CASES

(71) Applicant: International Business Machines Corporation, Armonk, NY (US)

(72) Inventors: Srinivas N. V. Gannavarapu, Medak (IN); Praveen K. Midde, Hyderabad (IN); Saisaran Yaratapalli, Nellore (IN)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 14/933,475

(22) Filed: Nov. 5, 2015

(65) Prior Publication Data
US 2017/0132517 A1    May 11, 2017

(51) Int. Cl.
*G06F 7/08* (2006.01)
*G06N 5/02* (2006.01)
*G06F 17/30* (2006.01)

(52) U.S. Cl.
CPC .......... *G06F 7/08* (2013.01); *G06F 17/30011* (2013.01); *G06F 17/30722* (2013.01); *G06N 5/022* (2013.01)

(58) Field of Classification Search
CPC combination set(s) only.
See application file for complete search history.

(56) References Cited

U.S. PATENT DOCUMENTS

| 5,224,206 | A | 6/1993 | Simoudis | |
|---|---|---|---|---|
| 8,136,025 | B1 * | 3/2012 | Zhu | G06F 17/30864 707/634 |
| 8,473,493 | B2 * | 6/2013 | Jin | G06Q 10/107 707/706 |
| 8,856,641 | B2 * | 10/2014 | Pueyo | G06F 17/3082 348/460 |
| 8,918,717 | B2 * | 12/2014 | Brooks | G06Q 10/10 707/771 |

(Continued)

OTHER PUBLICATIONS

Advanced Case Management Enabled by Business Provenance, Axel Martens, Aleksander Slominski, Geetika T. Lakshmanan, Nirmal Mukhi, IBM TJ Watson Research Center, 2012 IEEE 19th International Conference on Web Services, 978-0-7695-4752-7/12 2012 IEEE, DOI 10.1109/ICWS.2012.68.*

(Continued)

*Primary Examiner* — Michael B Holmes
(74) *Attorney, Agent, or Firm* — Alexander G. Jochym (57) ABSTRACT

An approach for dynamically providing a prioritized list of relevant cases includes a computer generating a set of tags for a case and retrieving a set of tags for completed cases. The approach includes the computer sorting the set of tags for the case and the set of tags for the completed cases into a set of tag types. The approach includes the computer determining a set of matching tags for each of the set of tag types between the case and completed cases. Furthermore, the approach includes the computer determining an ordered list of the completed cases. The ordered list is based, at least in part, on a number of matching tags in the set of matching tags corresponding to the completed case in the completed cases, and a number of matching tags in the set of matching tags in a tag type in the set of tag types.

17 Claims, 6 Drawing Sheets

(56) References Cited

U.S. PATENT DOCUMENTS

| | | | | |
|---|---|---|---|---|
| 8,943,527 | B2* | 1/2015 | Ghashghai | H04H 60/39 725/14 |
| 9,218,324 | B2* | 12/2015 | Boyer | G06F 17/212 |
| 9,223,760 | B2* | 12/2015 | Boyer | G06F 17/212 |
| 2013/0060787 | A1 | 3/2013 | Doshi et al. | |
| 2013/0231978 | A1* | 9/2013 | Curbera | G06Q 10/06393 705/7.36 |
| 2013/0332369 | A1* | 12/2013 | Paramashivappa | G06Q 10/06311 705/301 |
| 2013/0332403 | A1* | 12/2013 | Paramashivappa | G06Q 10/06311 706/46 |
| 2014/0019834 | A1* | 1/2014 | Boyer | G06F 17/212 715/202 |
| 2014/0019887 | A1* | 1/2014 | Boyer | G06F 17/212 715/760 |
| 2014/0074832 | A1* | 3/2014 | Chitiveli | G06F 17/30073 707/736 |
| 2014/0114671 | A1* | 4/2014 | Hu | G06F 19/325 705/2 |
| 2014/0114673 | A1* | 4/2014 | Hu | G06F 19/325 705/2 |
| 2014/0114864 | A1* | 4/2014 | Babich | G06Q 10/00 705/304 |
| 2014/0114865 | A1* | 4/2014 | Babich | G06Q 10/00 705/304 |
| 2015/0006231 | A1* | 1/2015 | Jandhyala | G06Q 10/06316 705/7.26 |
| 2015/0006235 | A1* | 1/2015 | Jandhyala | G06Q 10/06316 705/7.26 |
| 2015/0112917 | A1 | 4/2015 | Lorentzen et al. | |
| 2015/0278316 | A1* | 10/2015 | Pasupathi | G06Q 10/06 707/722 |
| 2015/0278717 | A1* | 10/2015 | Pasupathi | G06Q 10/06 705/342 |
| 2016/0267117 | A1* | 9/2016 | Guggilla | G06F 17/30327 |
| 2016/0292368 | A1* | 10/2016 | Padarthi | G06Q 10/063114 |
| 2016/0292618 | A1* | 10/2016 | Padarthi | G06Q 10/063114 |
| 2016/0306852 | A1* | 10/2016 | Guggilla | G06F 17/30327 |
| 2017/0132517 | A1* | 5/2017 | Gannavarapu | G06N 5/022 |
| 2017/0212726 | A1* | 7/2017 | Gannavarapu | G06N 5/022 |

OTHER PUBLICATIONS

Supply chain management and advanced planning—basics, overview and challenges, Hartmut Stadtler, Elsevier B.V. doi:10.1016/j.ejor.2004.03.001, Fachgebiet Produktion & Supply Chain Management, Institut fëur Betriebswirtschaftslehre, Technische Universitëat Darmstadt, Hochschulstraße 1, D 64289 Darmstadt, Germany.*

IEEE Graph-Based Pattern-Oriented, Context-Sensitive Source Code Completion Anh Tuan Nguyen, Tung Thanh Nguyen, Hoan Anh Nguyen Ahmed Tamrawi, Hung Viet Nguyen, Jafar Al-Kofahi, Tien N. Nguyen Electrical and Computer Engineering Department Iowa State University pp. 69-79 2012 IEEE.*

"Advanced case management", From Wikipedia, the free encyclopedia, last modified on Mar. 24, 2015, Printed on: Jul. 24, 2015, 2 pages, <https://en.wikipedia.org/wiki/Advanced_case_management>.

"Case-Based Reasoning Wiki", From Wikipedia, the free encyclopedia, last modified on Sep. 23, 2012, Printed on Jul. 24, 2015, 1 page, <http://cbrwiki.fdi.ucm.es/mediawiki/index.php/Main_Page>.

"Nuxeo Case Management Framework 5.5", Nuxeo, Released on Feb. 11, 2013, Copyright © 2010-2013 Nuxeo, 38 pages, <https://www.google.co.in/url?sa=t&rct=j&q=&esrc=s&source=web&cd=7&cad=rja&uact=8&sqi=2&ved=0CEEQFjAG&url=http%3A%2F%2Fdoc.nuxeo.com%2Fdownload%2Fattachments%2F8684602%2FNuxeo_Case_Management_5.5_UserGuide.pdf&ei=A1ZTVb2HLaW_mwXruYHYDA&usg=AFQjCNHZa5oJihv49Q0_8siR23BsXBnZtA&bvm=bv.93112503,d.c2E>.

* cited by examiner

CASE W — 401

| TAG | OCCURRENCE | TYPE |
|---|---|---|
| P1 | 1 | PROPERTY |
| P3 | 1 | PROPERTY |
| P7 | 1 | PROPERTY |
| C2 | 1 | COMMENT |
| C3 | 2 | COMMENT |
| D4 | 3 | DOCUMENT |
| D6 | 2 | DOCUMENT |

EXAMPLE OF A MULTI-VALUED OBJECT FOR A WIP CASE

CASE A — 402

| TAG | OCCURRENCE | TYPE |
|---|---|---|
| P1 | 1 | PROPERTY |
| P2 | 1 | PROPERTY |
| P5 | 1 | COMMENT |
| P7 | 1 | COMMENT |
| C1 | 3 | COMMENT |
| D3 | 2 | DOCUMENT |
| D4 | 1 | DOCUMENT |

CASE B — 403

| TAG | OCCURRENCE | TYPE |
|---|---|---|
| P3 | 1 | PROPERTY |
| P5 | 2 | PROPERTY |
| C4 | 2 | COMMENT |
| C2 | 4 | COMMENT |
| C5 | 1 | COMMENT |
| D3 | 3 | DOCUMENT |
| D4 | 4 | DOCUMENT |

CASE C — 404

| TAG | OCCURRENCE | TYPE |
|---|---|---|
| P2 | 1 | PROPERTY |
| P5 | 1 | PROPERTY |
| C3 | 4 | COMMENT |
| C2 | 5 | COMMENT |
| D4 | 2 | DOCUMENT |
| D6 | 3 | DOCUMENT |

EXAMPLE OF MULTI-VALUED OBJECTS FOR COMPLETED CASES

DYNAMICALLY DETERMINING RELEVANT CASES

BACKGROUND OF THE INVENTION

The present invention relates generally to the field of case management systems and more particularly to advanced case management systems.

Case-based reasoning is a real-time predictive analytic technique that utilizes specific knowledge of previously experienced problem situations to solve a new problem by finding one or more similar cases. Case-based reasoning applies the experiences and steps used in solving the similar problem to solve the new problem. Case-based systems are computer-based systems that can quickly access large amounts of data on previously encountered problems. Case management systems using case-based reasoning to detect similar problems or similar cases and propose solutions to a user based on the information mined from similar cases stored in one or more databases. Each of the stored cases typically includes a problem or case description and a described solution in the databases supporting case-based systems.

Advanced case management systems utilize dynamic or adaptive case management techniques that provide the ability to monitor, update, understand, and interpret a piece of work or a case as it is processed. Advanced case based management systems driven by incoming events that can change the context of the information, require responses from users such as caseworkers in various fields. Advanced case based management systems help users make faster, better, and more accurate decisions by providing dynamic analysis of previous cases, case workflows, and processes. Case-based systems and advanced case-base systems are applied to cases in many fields such as social work, medicine, legal, and business.

SUMMARY

Embodiments of the present invention disclose a method, a computer program product, and a system for dynamically providing a prioritized list of relevant cases. The method includes one or more computer processors generating a set of tags for a first case and retrieving a set of tags for a plurality of completed cases. The method includes one or more computer processors sorting the set of tags for the first case and the set of tags for the plurality of completed cases into a set of tag types. The method then includes one or more computer processors determining a set of matching tags for each of the set of tag types between the first case and at least one of the plurality of completed cases. Furthermore, the method includes one or more computer processors determining an ordered list of the plurality of completed cases. The ordered list is based, at least in part, on a number of matching tags in the set of matching tags corresponding to the at least one completed case in the plurality of completed cases, and a number of matching tags in the set of matching tags in a tag type in the set of tag types.

DETAILED DESCRIPTION

Embodiments of the present invention recognize that in situations where a caseworker or a user refers to previously completed casework, a search requiring parameter and/or content matching is done to determine similar or relevant cases. However, in some situations, the user may not know what to search for or what is needed to work on a case, in this situation, a computer system that can intelligently search for cases in a dynamic manner as work progresses on the case can improve the caseworker's or user's effectiveness and performance.

Embodiments of the present invention provide a method for dynamically identifying and determining relevant or similar cases by considering current work in progress and the case flow history (e.g., the way the case progresses). Embodiments of the present invention include creating a prioritized or ordered list of relevant cases based on an analysis and comparison of tags created for a case to tags for previously completed cases. The comparison occurs by dynamically extracting and applying tags for a work-in-progress case and matching tag types and tags to the stored tag types (e.g., product_tags, comment_tags, and document_tags) for each of the previously completed cases. Embodiments of the present invention provide a method of prioritizing the comparison of completed cases to a work in progress case. The evaluation of previously completed cases to the current case by tag type provides a user with an ordered list of relevant cases similar to the current case. While embodiments of the present invention discuss product_tags, comment_tags, and document_tags, the present invention is not limited to these tag types but may include other tag types (e.g., claim_tags, examination_tags, etc.). Additionally, embodiments of the present invention provide a method to update the ordered list of relevant cases based on a comparison of case flow histories for the work-in-progress case and each of the completed cases. Embodiments of the present invention provide a dynamic or real-time determination of relevant cases as input to the current case content, current casework flow is entered, and in response, relevant case evaluations automatically occur to update the determined relevant case list.

Figure 1:
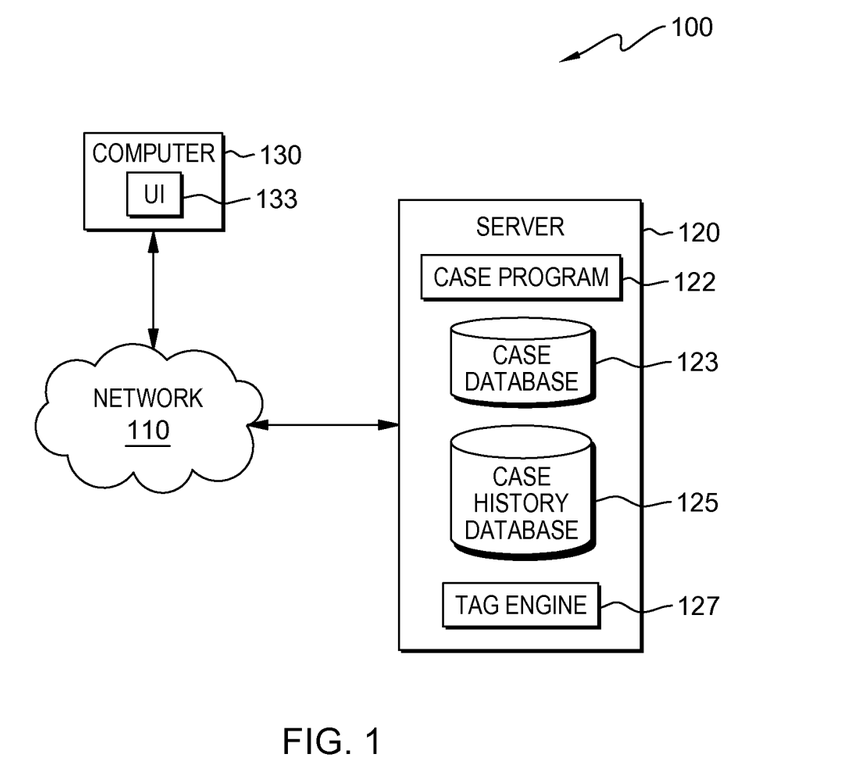
FIG. 1 is a functional block diagram illustrating a distributed data processing environment, in accordance with an embodiment of the present invention.

Implementation of embodiments of the invention may take a variety of forms, and exemplary implementation details are discussed subsequently with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 120 and computer 130 interconnected over network 110. Network 110 can be, for example, a telecommunications network, a local area network (LAN), a virtual LAN (VLAN), a wide area network (WAN), such as the Internet, or a combination of these, and can include wired, wireless, virtual, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications between server 120, computer 130 and other computing devices (not shown) within distributed data processing environment 100.

Server 120 can be a standalone computing device, a management server, a web server, a mobile computing device, or any other electronic device or computing system capable of receiving, sending, storing, and processing data. In another embodiment, server 120 can be a laptop computer, a tablet computer, a netbook computer, a personal computer (PC), a desktop computer, a personal digital assistant (PDA), a smart phone, or any programmable electronic device capable of communicating with computer 130 and other computing devices (not shown). In some embodiments, server 120 represents a computing system utilizing clustered computers and components (e.g., database server computers, application server computers, etc.) that act as a single pool of seamless resources, such as in a cloud computing environment, when accessed within distributed data processing environment 100. In various embodiments, each of the programs, applications, and databases on server 120 and computer 130 can reside on various other computing devices within distributed data processing environment 100, provided each has access to information and storage for implementation and operations of the present invention via network 110. Server 120 hosts case program 122, case database 123, case history database 125, and tag engine 127. Server 120 sends and receives data such as new cases or edits to current cases from a user input on user interface (UI) 133 in computer 130. Server 120 stores information on completed cases including extracted tags, a number of recorded tag occurrences in each case, and timelines in case database 123. Server 120 stores updates to case history (e.g., new cases, updated cases, and completed cases) that includes along with the case, at least the attached documents, comments, tasks, extracted tags for each case with a date stamp in case history database 125.

Case program 122 dynamically identifies and prioritizes relevant cases by matching tags and a case pattern or a case flow history of a current work-in-progress (WIP) case to each completed case (i.e., completed or closed cases that have been successfully completed with an acknowledged resolution). Case program 122 searches provided structured case information and attached documents, comments, and other case related text (e.g., case documents and attached case content) for property_tags. Case program 122 sends comments and documents attached to the WIP case to tag engine 127. Tag engine 127 extracts tags from comments and attached documents. The tags are extracted by tag engine 127 from unstructured case content and grouped by tag type based on the source of the identified tag (e.g., a comment and/or a document). In other embodiments, case program 122 sends case information for other types of tags to tag engine 127. For example, case program 122 can send unstructured content such as medical test results to tag engine 127 and receive from tag engine 127 tags from medical claims that may be generated by case program 122 as medicaltest_tags.

For comments attached to the WIP case, case program 122 receives from tag engine 127 tags identified by a tag name and the number of occurrences of the tag recorded by tag engine 127. For each identified tag received from tag engine 127 for the WIP case comments, case program 122 applies a comment_tag, a tag name, and records the number of occurrences of the tag in the WIP comments.

Similarly, case program 122 sends the documents attached to the WIP case to tag engine 127. Case program 122 receives from tag engine 127 tags identified by tag name and the number of occurrences for each tag in the documents. Case program 122 generates a tag name, a document_tag, and records with it the number of occurrences for each received tag from the documents.

Case program 122 sends the tags with the number of occurrences for each tag from creation of a multi-valued object for the WIP case. For example, case program 122 sends property_tags, comment_tags, and document_tags to create a MVO for the WIP case. During implementation, the set of tags for each case (i.e., property_tags, comment_tags, and document_tags) are represented as a multi-valued object (MVO) that may be stored within the case as a case property. For each case and for each tag, the number of occurrences of the tag in a case is recorded with the tag. As a result, each case (new, current, or completed) has one MVO that holds all of the different types of tags or identification tags and the number of occurrences of a tag in a case. While the embodiments of the present invention discuss the use of property_tags, comment_tags, and document_tags, as known to one skilled in art, the application of the methods and techniques described are not limited to property_tags, comment_tags, and document_tags but, may be applied with one or more other identified types of tags. For example, case program 122 may be configured to extract medicaltest_tags.

Case program 122 retrieves completed cases from case database 123 and extracts the identification tags and number of occurrences for each case from each completed case. Similarly, case program 122 extracts identification tags with an associated number of occurrences for the WIP case. Case program 122 iteratively executes a case-by-case comparison of identification tags and occurrences for completed cases to the WIP case identification tags and occurrences to identify matching tags in the each of the completed cases. Case program 122 applies a prioritization to the tag types for the identified matching tags in the compared cases to determine an ordered list of relevant cases. Case program 122 is pre-configured in with a set prioritization of tags types (e.g., highest priority given to property_tags and lowest prioritization to document_tags). In some embodiments, a user determines or sets the tag type prioritization using UI 133. The comparison of cases occurs automatically, in real-time when a case is retrieved or opened for editing. Case program 122 provides a dynamic, ordered list of relevant cases based on an analysis of new or edited cases using a prioritization of matching identification tags.

In addition, case program 122 retrieves case flow history such as task progression for the WIP case and each of the completed cases. The case flow history may be tasks such as user identified or input tasks (e.g., mandatory or optional tasks) in a received new, updated, or completed case. Case program 122 does a case-by-case comparison of the case flow history, which is a comparison to match tasks in the WIP case flow history to each of the tasks in the case flow history of each of the completed cases. Case program 122 determines the case flow history with case flow most similar to or best matching the WIP case (e.g., the first three tasks completed in a completed case flow history match the first three tasks completed in the WIP case). Based on the results of the case-by-case comparison of the case flow history, case program 122 adjusts the ordered list of the relevant cases. The ordered list of relevant cases can be sent to a user for use in determining a solution or an efficient known path for a solution or case resolution based on the experiences gathered in the relevant completed cases.

Case database 123 on server 120 stores completed case data. Case database 123 includes data and information on previously closed cases. In various embodiments, case database 123 stores information regarding how previous or closed cases were addressed such as the work flow history or a case flow history that includes the events, tasks, and steps, taken to resolve the case. The information on work flow history or patterns of applied steps, tasks or events stored in case database 123 may be retrieved by case program 122 to determine relevant closed cases similar to the WIP case (e.g., to provide possible direction or steps to the user for proceeding with the WIP case). Case database 123 stores and retrieves data for case program 122. Case database 123 stores completed case data such as completed case identification tags. The completed case identification tags are the last set of identification tags (e.g., property_tags, comment_tags, and document_tags) extracted and received from case program 122 when the case is completed. Case database 123 stores the most recent set of completed case identification and retrieves the completed case identification tags for case program 122.

Case history database 125 resides on server 120. Case history database 125 stores and receives case flow history for WIP cases (e.g., created new cases, edited, or currently open cases). The case flow history includes information on the status and progression of a case. For example, case flow histories include one or more of the tasks (i.e., mandatory and optional tasks), generated identification tags (e.g., property_tags, document_tags, comment_tags) contained in the MVO, information received and actions taken in a cases with an order or timeline. For example, the order or timeline for a case flow history includes the type of tasks performed for a case and an order in which tasks are completed based on a time of completion of the task that may be recorded with a date stamp. Case history database 125 may receive from case program 122 new updates or edits to a case flow history for any open/current or new case and may send stored case flow history such as case tasks to case program 122. While depicted on server 120, case database 123 and case history database 125 may reside on one or more different computer devices such as another server or a cloud.

Tag engine 127 receives from case program 122 case content including attached case comments, documents, and other similar case attachments extracted from the WIP case. Using known techniques such as natural language processing and semantic analysis, tag engine 127 searches the received case content (both structured and unstructured content), extracts, and identifies tags for comments and attached documents received for the WIP case. In various embodiments, tag engine 127 is a known software program or an external component for identifying and generating tags as known to one skilled in the art. Tag engine 127 identifies and generates a set of one or more tags for the comments received from case program 122. Tag engine 127 also identifies and generates a set of one or more tags for the documents received from case program 122. Tag engine 127 records the number of occurrences for each tag. In an embodiment, tag engine 127 identifies property_tags and property_tag occurrences. In various embodiments, tag engine 127 identifies tags from other sources received from case program 122. For example, tags may be extracted and generated by tag engine 127 for police reports or safety inspections. Tag engine 127 returns the tags and the number of occurrences for each tag to case program 122. In various embodiments, tag engine 127 applies a date stamp for each tag created based on the date the source data is created. The source data may be the comment or the document from which the tag is created. For example, a comment is recorded on Oct. 4, 2015 and a date stamp is recorded with the generated tag for 10/4/2015.

In various embodiments, computer 130 is a client to server 120. Computer 130 includes UI 133. Computer 130 may be a notebook, a laptop, a personal digital assistant, a tablet, a smart phone, wearable computing device, or other computing system connected to server 120 via network 110. Computer 130 sends and receives data and information such as new cases and attached case content to and from case program 122 on server 120. Computer 130 may send and receive data from other computing devices (not shown). While computer 130 is depicted as a single client device, multiple computing devices or client devices may communicate and exchange data with server 120 via network 110. UI 133 on computer 130 is a user interface providing an interface between a user of computer 130 and server 120, and enables a user of computer 130 to interact with programs and data on server 120, computer 130, and other computing devices (not shown). UI 133 may be a graphical user interface (GUI), an active area or line for text inputs, a web user interface (WUI), or other type of user interface and can display text, documents, user options, application interfaces, and instructions for operation such as queries, and include the information that a program present to a user. For example, UI 133 displays to a user an ordered list of relevant cases received by computer 130 from case program 122.

Figure 2:
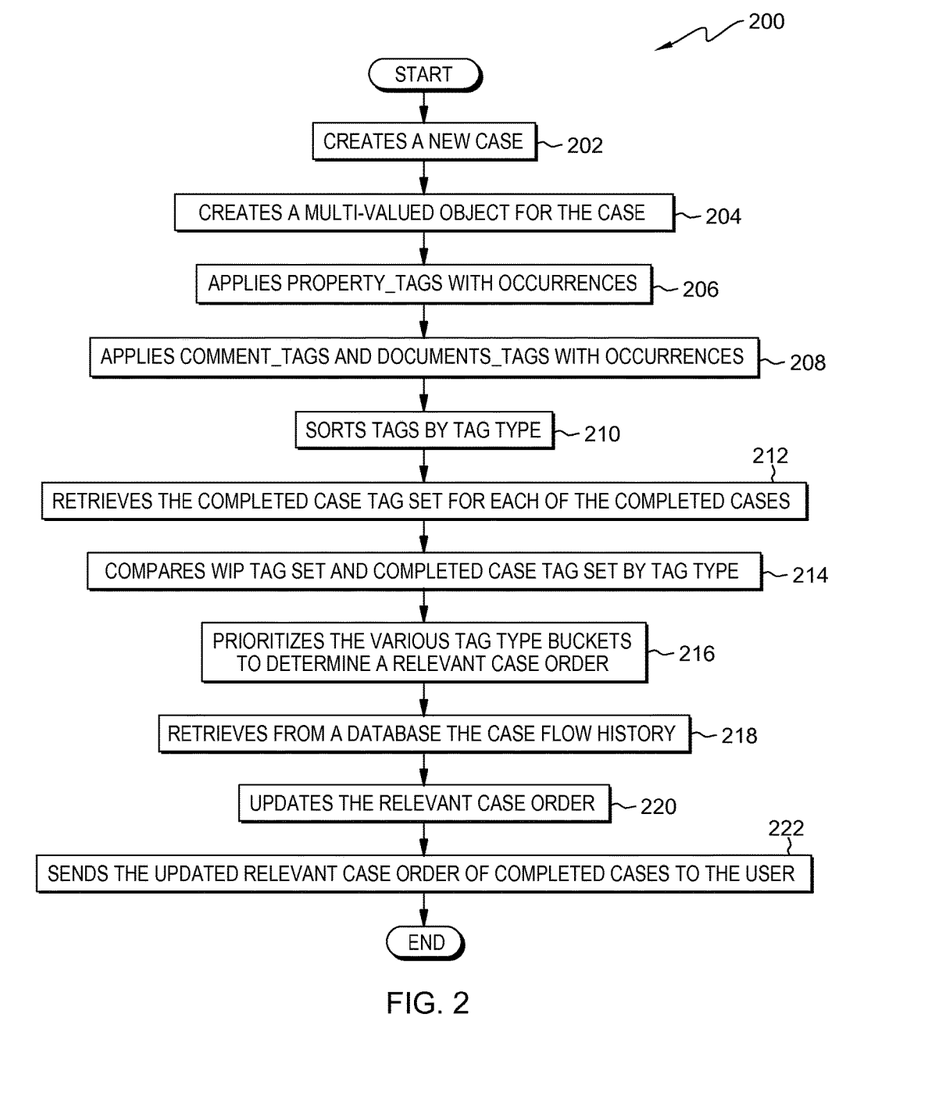
FIG. 2 is a flowchart depicting operational steps of a case program on a server within a distributed data processing environment, for dynamically determining a prioritized list of relevant cases for a current case, in accordance with an embodiment of the present invention.

FIG. 2 is a flowchart 200 depicting operational steps of case program 122 on server 120 within distributed data processing environment 100, for dynamically determining a prioritized list of relevant cases for a current case, in accordance with an embodiment of the present invention. Case program 122 creates a new case (202). Case program 122 receives a new case from a user on UI 133. The new case may include attached documents, comments, and identified tasks some of which may be identified as mandatory or optional tasks. The attached documents, comments, and tasks are provided or input by the user during case design or case definition for inclusion when the user transmits the case to case program 122. In some embodiments, case program 122 receives an existing case for editing and analysis.

The new case (or the existing case for editing) will be referred as the work-in-progress (WIP) case. A document may be an attached document such as a user completed medical form. A comment may be a notation or a written comment on a patient admittance form such as "patient is flushed." A task is an action to be performed that may be identified as a mandatory task (i.e., that must be completed) or an optional task (i.e., that may or may not be completed) for case completion. For example, tasks may be received with a new case (i.e., added by a user when a new case is input or opened), or when a case (e.g., new or existing) is edited by a user and sent back to case program 122. Case program 122 stores the new case with associated information including tasks and attached documents/comments in case history database 125.

Case program 122 creates a multi-valued object for the case (204). The MVO is a programming object that holds a set of various types of tags (e.g., property_tags, comment_tags, and object_tags). A set is one or more of an element. For example, a set of various tag types is one or more tag types. The MVO is stored within the case as a case property.

After receiving the WIP case, case program 122 applies property_tags (206). In various embodiments, case program 122 searches the WIP case for property_tags. A property tag is a tag that holds the case property for an attribute or value. A property tag can be defined by a user on UI 133 by a pre-configured definition of property tags in case program 122. A property_tag may be automatically identified by case program 122. For example, case program 122 searches a car insurance case to extract one or more property_tags identifying one or more case properties such as a car make, a car model, a car year, a car vehicle identification number, an insurer's name, an insurer's address, or an insurer's license number by scanning the insurance application for the property_tags. In some embodiments, property_tags are manually populated by a user during case design or input in case program 122. In other embodiments, property_tags are identified by case program 122 and are manually input by a user. Case program 122 adds the one or more property_tags identified by the program to the MVO for the WIP case.

Case program 122 applies comment_tags and document_tags (208). Case program 122 sends the case comments and the attached case documents to tag engine 127. Tag engine 127 extracts content from the received case comments included in the WIP case. Tag engine 127 determines and identifies tags for each of the comments extracted from the comment content received by tag engine 127. Tag engine 127 identifies the tags for the WIP comments using known methods and records the number of occurrences for each identified tag. Tag engine 127 sends the identified tags and the number of recorded occurrences for each tag to case program 122. For each tag in the set of tags received from tag engine 127 that are extracted from the case comment content, case program 122 creates and generates a comment_tag and records the number of occurrences for that comment_tag. Case program 122 sends each of the comment_tags and the number of occurrences of the tag to the MVO for the WIP case. For example as depicted in in Table 1 depicted below, a tag, "verified," which may be extracted from a comment such as "adjuster verified accident damage" in a car insurance case is listed as a "comment_tag" for the tag type and the tag has three occurrences in the MVO depicted in Table 1.

Similarly, for each document of the WIP case, case program 122 sends the content of the attached case documents to tag engine 127. Tag engine 127 determines and identifies tags for each of the documents using methods known to one skilled in the art (e.g., NLP) extracted from the case document content received by tag engine 127. Tag engine 127 sends to case program 122 the tags identified or extracted from the received document content of the WIP case. Case program 122 generates and applies a document_tag to each tag received from tag engine 127 that was extracted from the document content of the WIP case. Case program 122 records the number of occurrences for each document_tag. Case program 122 adds each document_tag of the set of document_tags created from the attached documents and the number of occurrences to the MVO for the WIP case. For example, as depicted in Table 1 tag engine 127 identifies and generates a tag "Umbrella Coverage" with one occurrence from the documents received from case program 122 that is received by case program 122. Case program 122 in response, generates a property_tag for the tag "Umbrella Coverage" which has one occurrence and sends the generated property_tag for inclusion in the MVO for the WIP case.

After case program 122 automatically applies the comment_tags and document_tags for the case, the program sends the tags for inclusion in the MVO for the case. The MVO is populated with the various types of tags in the WIP case (e.g., property_tags, document_tags, and comment_tags) listed with the number of occurrences for each tag. An example of a MVO is illustrated below in Table 1:

TABLE 1

| Multi-valued object (MVO) example | | |
|---|---|---|
| TAG | TAG TYPE | OCCURRENCES |
| Delhi | PROPERTY_TAG | 1 |
| Car Loan | PROPERTY_TAG | 1 |
| Verified | COMMENT_TAG | 3 |
| Umbrella Coverage | DOCUMENT_TAG | 1 |

The various tags stored in the MVO of the WIP case (e.g., the property_tags, the document_tags, and the comment_tags) with the respective number of occurrences for each tag) may be called the WIP tag set. The WIP tag set is marked with a date stamp by case program 122 and stored in case history database 125.

Case program 122 sorts tags by tag type (210). Case program 122 sorts the WIP tag set by tag type (e.g., by property_tags, comment_tags, and document_tags) and includes the number of occurrences for each tag type.

Case program 122 retrieves a completed tag set for each completed case (212). Case program 122 retrieves the MVO containing the completed tag set for each completed case stored in case database 123. When a case is successfully completed or resolved (i.e., no further actions are needed), the case is stored by case program 122 as a completed case in case database 123. When the case is determined as completed, the MVO for the closed case includes the last WIP tag set created for the completed case. The user determines case completion and indicates case completion to case program 122 through a command or other user interface selection method on UI 133. In response, case program 122 saves the last WIP tag set as the completed case (completed case) tag set contained in the completed case MVO. Case program 122 stores the completed case MVO in case database 123.

After retrieving the MVO for each completed case from case database 123, case program 122 fetches the completed case tag sets stored in each of the closed case MVOs. Like the WIP tag set, the completed case tag set includes the property_tags, document_tags, and comment_tags with the respective number of occurrences for each tag and a date stamp for completed case tag set creation.

Case program 122 compares WIP tag set and completed case tag set by tag type (214). Case program 122 compares the data for each type of tag (e.g., property_tags, document_tags, and comment_tags) to identify matching tags between the WIP tag set and each of the completed case tag sets. Case program 122 creates a bucket for each tag type (i.e., property bucket, document bucket, and comment bucket). For the purposes of embodiments of the present invention, a bucket is an internal logical element that holds an ordered set of cases where the order of the set of cases is based on the number of tags matched between the WIP case and each of the retrieved completed cases.

The WIP tag set and the completed case tag set for each completed case are iteratively compared. The WIP tag set is compared to the completed case tag set to identify completed case tags by type that match the respective WIP tags. Based, at least in part on the identified matching tags, the tag type buckets (e.g., property bucket, comment bucket, and document bucket) are populated with an ordered list of completed cases. The ordered list for each bucket is based on the number of completed case tags for each tag type that match the tags of the respective WIP tag type tags. The property bucket is filled with an ordered list of completed cases that are sorted based on the number of property_tags in each completed case that match the WIP property_tags. In other words, the completed cases in the property bucket are ordered by the number of property_tags in the completed case tag set of a completed case that match the property_tags of the WIP tag set. In various embodiments, the ordered list for the property bucket progresses from the completed case with the most matches to the property_tags in the WIP tag set to the completed case with the least matches to the property_tags in the WIP tag set.

Figure 4:
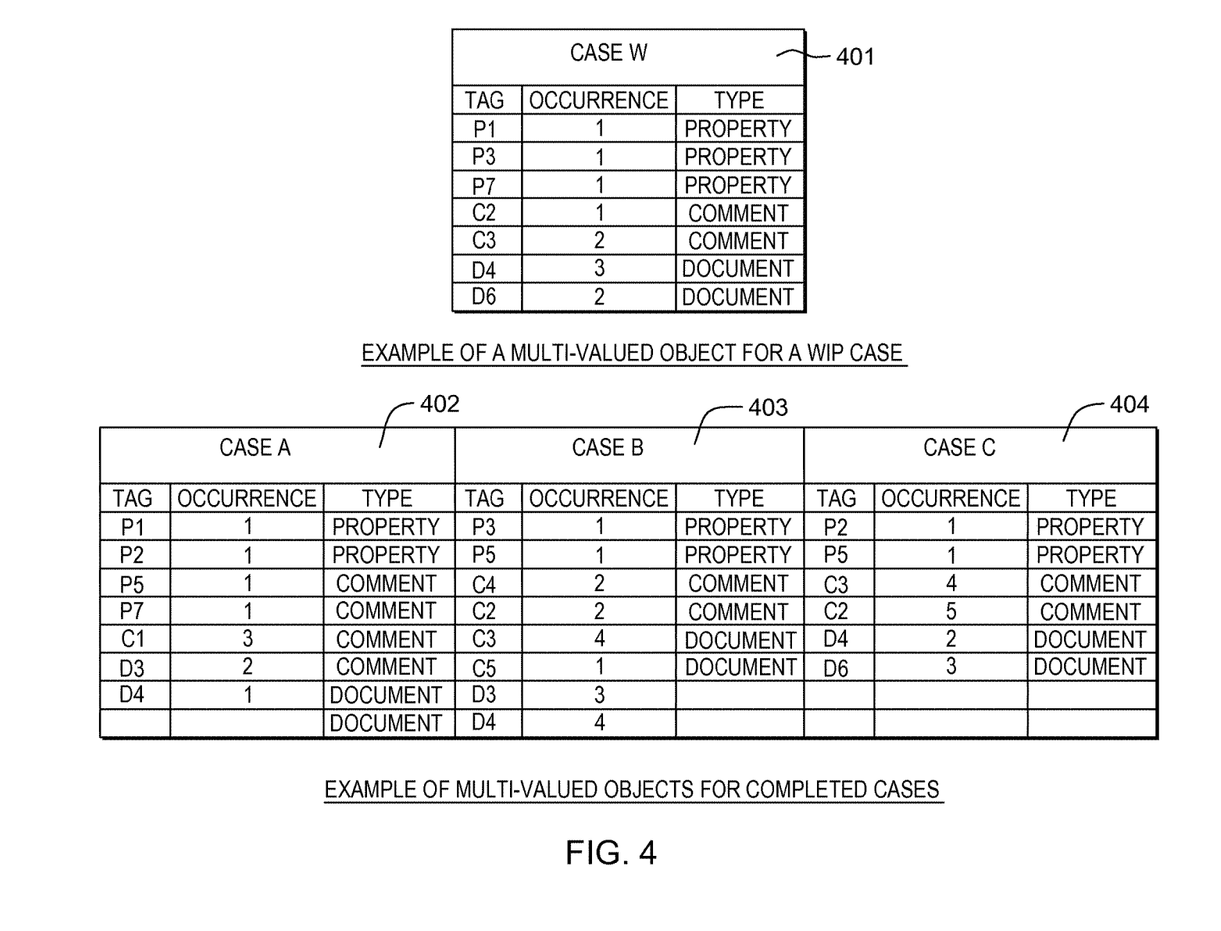
FIG. 4 is an example of multi-valued objects for completed cases and a WIP case, in accordance with an embodiment of the present invention.

Using the WIP case example that is case W 401, depicted in FIG. 4, the WIP property tag set is {P1, P3, P7} and the property tag set is {P1, P2, P5, P7} for completed case A 402. Comparing the property_tags for WIP case, case W 401 and completed case, case A 402 results a match for property_tags P1 and P7. The results of the matched property_tags for the comparison of case W 401 and case A 402 are sent to the property bucket. The number of completed case occurrences of property_tags matches for the closed case compared to the WIP case are included with the results of the matched property_tags for each of the closed cases. In this case, the property bucket contains {(Case A, 2)}.

Continuing with the comparison of each closed case depicted in FIG. 4 to the WIP for the property bucket, for completed case B 403 the property_tag set is {P3, P5} where P3 matches the property_tag set of WIP case W 401. Adding the match for case B 403 to case W 401, the property bucket now contains {(Case B, 1), (Case A, 2)}. Applying the same method for comparing the property tag set of case C 404 to the property tag set of case W 401, the WIP case, results in the property bucket set of case W 401 (the WIP case) containing {(Case C, 0), (Case B, 1), (Case A, 2)}. Case program 122 continues to populate the property bucket for each completed case until all of the completed cases have been compared to the WIP case property_tags. The property bucket orders the completed cases by the completed cases with the highest or largest number of matching property_tags. In an embodiment, the ordered list for the completed cases goes from the completed cases with the least matches between WIP case property_tags and completed case the property_tags the completed case with the most matches.

Similarly, the comment bucket for the comparison of the comment_tags of the completed case tag set and the comment_tags of the WIP tag set is populated as an ordered list based on the number of comment_tags in the completed case that match the comment_tags in the WIP case. In various embodiments, the ordered list for the comment_tags goes from the completed case with the most matches to the comment_tags in the WIP tag set to the completed with the least number of matches.

Using the same process, the document bucket is populated using the comparison of the document_tags of the completed case tag set and the document_tags of the WIP tag set. In various embodiments, the property bucket is populated as an ordered list of completed cases based on the completed case with the highest number or the most document_tags that match the WIP case property_tags (from the WIP tag set) to the completed case with the least matches for the document_tags.

Case program 122 prioritizes the various tag type buckets to determine a relevant case order (216). Case program 122 prioritizes the various buckets for each of the tag types (e.g., the property bucket, the comment bucket, and the document bucket) into a single relevant case bucket. The relevant case bucket is populated with an ordered list of completed cases that identifies the completed cases most relevant or most likely to aid or provide the user with information such as task or case flow history on successfully completed cases that are most similar to the current or WIP case. The ordered list in the relevant case bucket may be determined by one or more methods.

In various embodiments, case program 122 prioritizes a first tag type bucket, followed by a second tag type bucket, and then, a third tag type bucket however, the prioritization is not limited to only three types of buckets. Case program 122 is configured with a tag type priority or bucket order. For example, the first tag type bucket used for determining an order for completed cases is the property bucket. The property bucket order is used to identify the most relevant or most similar completed cases in this example. When the property bucket is configured as the first tag type bucket used to determine relevant cases, the relevant case bucket is populated with the property bucket where the property bucket is populated or ordered from the completed case with the largest number of property_tags matching the WIP property_tags to the completed case with the least matching property_tags. For example, using FIG. 4 and the property bucket as the first tag type bucket, the relevant case bucket is populated from the most number of matching property_tags to the least number of property_tags resulting in an order of {(Case A, 2), (Case B, 1), (Case C, 0)} for the relevant case bucket.

In the case of a tie (i.e., when two or more cases have the same number of matching property_tags), then the second tag type bucket (e.g., the comment bucket) is used as a tiebreaker. In the event that there is a tie or the same number of matching comment_tags for two completed cases, then, the tiebreaker used to determine the relevant case order in the relevant case bucket is the third type of bucket (e.g., the document bucket order).

In the case of a tie after analyzing the third tag type bucket (e.g., the document bucket), the one or more tied cases can be listed as equally relevant cases (e.g., tied for most relevant). In some embodiments, if the determination of the first case in the ordered list for the relevant case bucket cannot be made (e.g., all of the property type buckets provide ties for the case with the most matched tags), then, case program 122 uses the case flow history to determine the relevant case order. In various embodiments, case program 122 provides for the relevant case bucket the ordered list of the relevant cases to the user. For example, case program 122 goes to step 222 and provides the ordered list of completed cases determined by the relevant case bucket to computer 130 and does not proceed to steps 218 and step 220. In other embodiments, case program 122 sends the ordered list of completed cases to computer 130 and then, continues to step 218 to evaluate or compare case flow histories of completed cases to the WIP case. A comparison of completed case flow histories to the WIP case may provide a user with additional guidance or direction on actions to take to resolve the WIP case such as the tasks to complete.

Case program 122 retrieves from a database the case flow history (218). In various embodiments, case program 122 retrieves a case flow history from case history database 125 for each of the closed cases and the WIP case. An analysis of the case flow history of the WIP case as compared to the case flow history of the completed cases can provide the user with help determining steps to take and an order to perform tasks based on the case flow histories of other similar closed cases. For example, the case flow history may be a history of tasks that may be identified as mandatory or optional tasks for each completed case. In an embodiment, case program 122 analyzes the order or the progression of each of the saved WIP tag sets and each of the completed case tag sets for similarities or matches. Case program 122 retrieves the WIP tag set and each completed case tag set in order as determined by the applied date stamps and compares the order of WIP tag set and completed case tag set progression for a case flow history.

In various embodiments, case program 122 iteratively extracts the case flow history from each completed case retrieved from case history database 125. For example, the case flow history for each case may include the tasks completed, a type of task (e.g., mandatory or optional), and the order in which the tasks were completed.

Case program 122 extracts the case flow history from the case history database 125 for the WIP case. For example, the case flow for the WIP case may be the extracted tasks which may be identified by the type of task (e.g., mandatory or optional) and the order in which the tasks have been completed.

For example, in a WIP case, the WIP case W, the case flow history for completing tasks is mandatory task 1, optional task 1. The case flow history for closed cases, A, B, and C is as follows:

Case A—mandatory task 3, optional task 1, optional task 2

Case B—mandatory task 1, optional task 1, mandatory task 3

Case C—mandatory task 1, optional task 1, mandatory task 2, optional task 4

Using the case flow history, case program 122 updates the relevant case order (220). Case program 122 compares the case flow history for the WIP case W to each of the case flow histories for the completed cases and determines an updated ordered list of relevant cases based on the number of matching tasks in the case flow history. If there are matches between the WIP case flow history and one or more of the case flow histories of the completed cases, then case program 122 updates or re-orders the relevant case bucket accordingly based on the completed case with the highest number or most case flow history matches. For example, analyzing the case flow history for Cases A, B, and C illustrated above to identify matches to the case flow history of the WIP case W, case program 122 determines that case flow history Case B and Case C match the case flow history of the WIP case but Case A does not. In this example, case program 122 may re-order the relevant bucket to reflect the case flow matches for case B and case C and, in response, re-orders the relevant case bucket in the order {Case B, Case C, Case A}. In some embodiments, case program 122 creates a separate case flow history bucket with a case flow history order for the user from matching case flow histories and a relevant case bucket with an ordered list of relevant cases based, at least in part, on matching property_tag types and a prioritization of tag types.

Case program 122 sends the updated relevant case order of completed cases to the user (222). In various embodiments, case program 122 sends an updated ordered list of relevant completed cases extracted from the relevant case bucket to the user for display on UI 133. The ordered list of relevant cases generated automatically by case program 122 helps the user quickly identify similar cases and provide direction for possible solutions. The relevant cases may aid the user in determining steps to follow, information to gather, the tasks to be completed, and an order for completion that can be applied to the WIP case. In one embodiment, case program 122 is configured to send a set number of relevant cases to the user. For example, case program 122 may only send the ten most relevant completed cases to the user. In another embodiment, case program 122 is configured for the number of relevant cases provided to computer 130 by case program 122 based on a user input. In this case, case program 122 may use a pop-up menu, typing a command for a specific number of relevant cases, a pull-down menu, or other user input method to select a desired number of relevant cases to be received from case program 122.

Figure 3A:
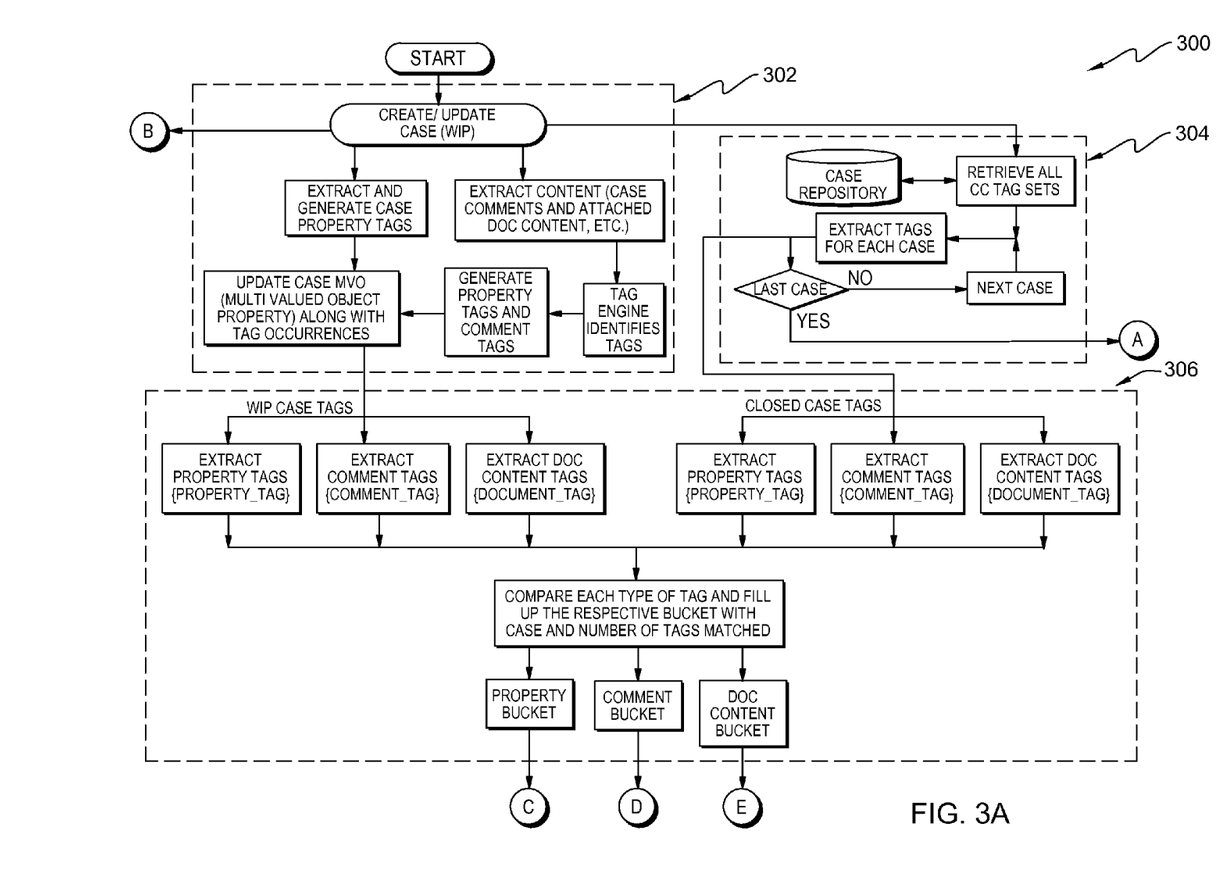
FIGS. 3A and 3B are examples of a block diagram illustrating the program flow for a case program, in accordance with an embodiment of the present invention.
Figure 3B:
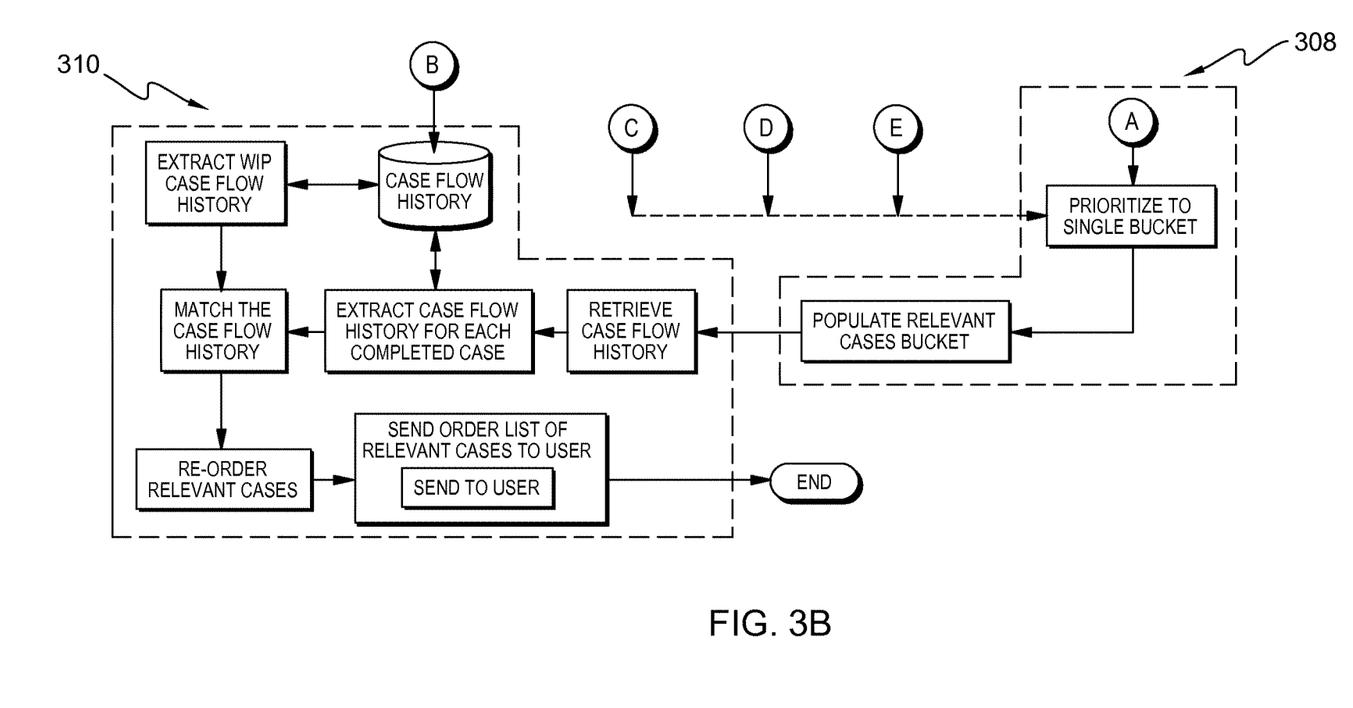

FIGS. 3A and 3B provide an example of a block diagram 300 illustrating the program flow for case program 122, in accordance with an embodiment of the present invention. As depicted, FIGS. 3A and 3B include tag routine 302, completed case tag routine 304, compare tags routine 306, relevant case routine 308, and compare case flow histories routine 310. FIG. 3 provides a block diagram illustrating some of the steps and elements as discussed in detail in FIG. 2 discussion.

Tag routine 302, in FIG. 3A, includes an illustration of steps 202 through 208 in FIG. 2. Completed case tags routine 304 retrieves completed case tag sets for all completed cases from case database 123 and iteratively extracts the tags by type and occurrences of each tag in for each completed case. In compare tags routine 306, case program 122 sorts WIP case tags and completed case tags by tag type. Case program 122 matches the tags by type in each of the completed cases to the tags by type for the WIP case and records the number of tags matched for each case and populates the bucket for each tag type based on the number of matches to the WIP case tags for each completed case. In relevant case routine 308, in FIG. 3B, case program 122 prioritizes by tag type the buckets into a single relevant case bucket. The relevant case bucket is populated with an ordered list of relevant cases determined by the prioritization and the number of matching tags in each completed case. In various embodiments, case program 122 sends the ordered list generated by the relevant case bucket order to the user on computer 130 at this step. Lastly, compare case flow histories routine 310, case program retrieves the case flow history for the WIP case and each of the completed cases from case history database 125 and iteratively matches the case flow history for each completed case to the WIP case flow in order to determine an updated ordered list of relevant cases based on the completed cases with most matches to the WIP case flow history. The updated ordered list of relevant cases is sent to the user on computer 130.

FIG. 4 is an example of MVOs for completed cases and a WIP case, in accordance with an embodiment of the present invention. As illustrated for case W 401 (WIP case), the MVO contains the tags by a tag name for a case, an identification of the tag type (e.g., document_tag), and the number of occurrences for the tag. The information contained in the MVO may be known as the WIP tag set.

Additionally, FIG. 4 illustrates the MVO for completed cases (i.e., cases A 402, case B 403, and case C 404). The information contained in the MVO for each of the completed case A 402, case B 403, and case C 404 may be known as the completed case (completed case) tag set. FIG. 4 is further discussed with reference to FIG. 2.

Figure 5:
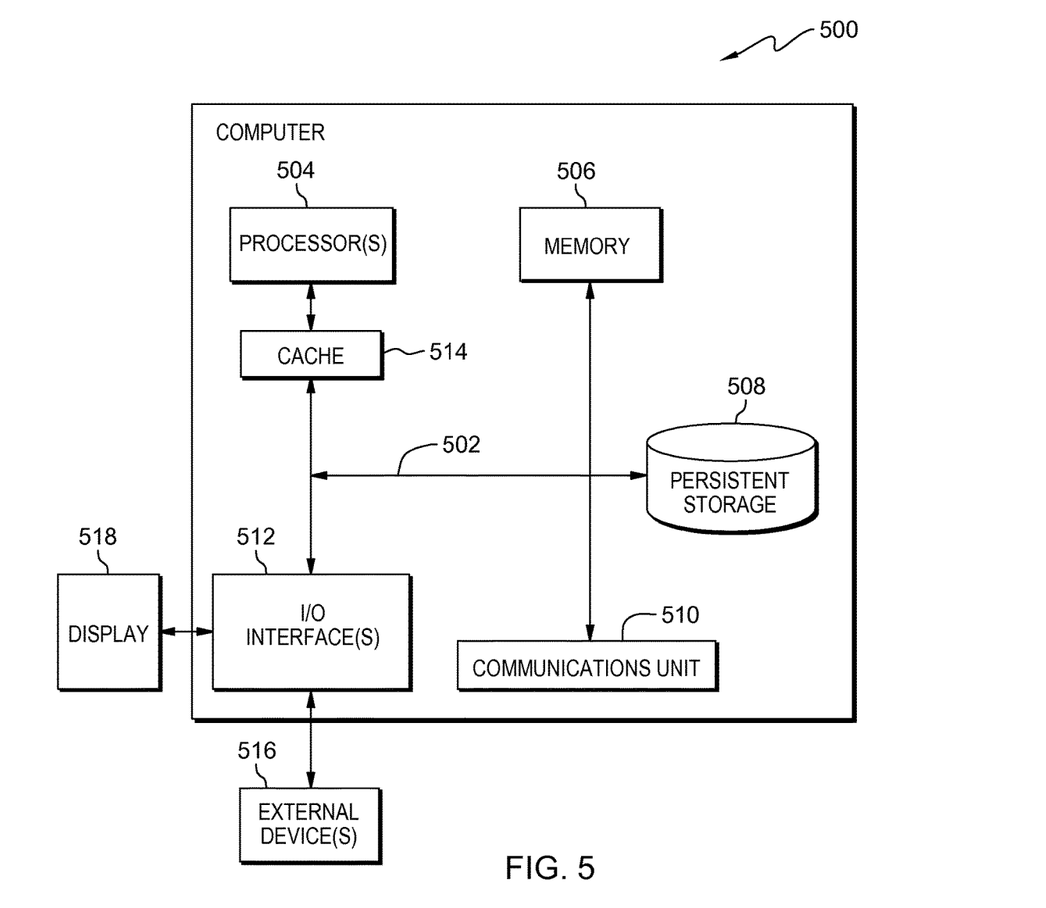
FIG. 5 depicts a block diagram of components of a computer system, which is an example of a system such as the server within the distributed data processing environment of FIG. 1, in accordance with an embodiment of the present invention.

FIG. 5 depicts a block diagram 500 of components of server 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server 120 includes communications fabric 502, which provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of computer processor(s) 504 by holding recently accessed data, and data near accessed data, from memory 506.

Case program 122 may be stored in persistent storage 508 and/or in memory 506 for execution by one or more of the respective computer processors 504 via cache 514. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Case program 122 may be downloaded to persistent storage 508 through communications unit 510.

I/O interface(s) 512 allows for input and output of data with other devices that may be connected to server 120. For example, I/O interface(s) 512 may provide a connection to external devices 516 such as a keyboard, keypad, a touch screen, and/or some other suitable input device. External devices 516 can also include portable computer readable storage media such as, for example, thumb drives, portable optical or magnetic disks, and memory cards. Software and data used to practice embodiments of the present invention, e.g., case program 122 can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method for dynamically providing a prioritized list of relevant cases, the method comprising:
   generating, by one or more computer processors, a set of tags for a first case;
   retrieving, by one or more computers, a set of tags for a plurality of completed cases;
   sorting, by one more computer processors, the set of tags for the first case and the set of tags for the plurality of completed cases into a set of tag types;
   determining, by one or more computer processors, a set of matching tags for each of the set of tag types between the first case and at least one completed case of the plurality of completed cases;
   creating, by one or more computer processors, for a user, a first ordered list of the plurality of completed cases, wherein the first ordered list is based, at least in part, on:
      a number of matching tags in the set of matching tags corresponding to the at least one completed case in the plurality of completed cases, and
      a number of matching tags in the set of matching tags in a tag type in the set of tag types;
   retrieving, by one or more computer processors, a case flow history for the first case and for each of the completed cases in the plurality of completed cases;
   comparing, by one or more computer processors, the case flow history for the first case to the case flow history for each of the completed cases in the plurality of completed cases; and
   creating, by one or more computer processors, for a user, a second ordered list of the plurality of completed cases based on the completed cases with a case flow most similar to the case flow of the first case.

2. The method of claim 1, wherein the set of matching tags is determined by a tag in the set of tags for the first case that matches a tag in the set of tags for the plurality of completed cases.

3. The method of claim 1, wherein create the first ordered list of the plurality of completed cases further comprises prioritizing, by one or more computer processors, an order by a tag type of the set of tag types for the number of matching tags in the set of matching tags in the tag type in the set of tags types.

4. The method of claim 1, generating a set of tags for a first case further comprises;
   extracting, by one or more computer processors, from a received case content for the first case, the set of tags, wherein the set of tags include tags extracted from the first case, tags identifying case properties, tags extracted from case comments, and tags extracted from case documents; and recording, by one or more computer processors, a number of occurrences for each tag.

5. The method of claim 1, further comprises:

creating, by one or more computer processors, a multi-valued object for the first case that includes each of the tag in the set of tags by a tag type of the set of tag types and a number of a tag occurrences.

6. The method of claim 1, wherein the case flow history includes at least one of a mandatory task and an optional task.

7. The method of claim 1, wherein the set of tag types includes at least a first tag type, a second tag type, and a third tag type:

wherein the tag types are at least one of a property type, a comment type, and a document type.

8. A computer program product for dynamically providing a prioritized list of relevant cases, the computer program product comprising:

one or more computer readable storage media and program instructions stored on the one or more computer readable storage media, the program instructions executable by a processor, the program instructions comprising:

program instructions to generate a set of tags for a first case;

program instructions to retrieve a set of tags for a plurality of completed cases;

program instructions to sort the set of tags for the first case and the set of tags for the plurality of completed cases into a set of tag types;

program instructions to determine a set of matching tags for each of the set of tag types between the first case and at least one of the plurality of completed cases;

program instructions to create, for a user, a first ordered list of the plurality of completed cases, wherein the first ordered list is based, at least in part, on:

a number of matching tags in the set of matching tags corresponding to the at least one completed case in the plurality of completed cases, and a number of matching tags in the set of matching tags in a tag type in the set of tag types;

program instructions to retrieve a case flow history for the first case and for each of the completed cases in the plurality of completed cases;

program instructions to compare the case flow history for the first case to the case flow history for each of the completed cases in the plurality of completed cases; and program instructions to create a second ordered list of the plurality of completed cases based on the completed cases with a case flow most similar to the case flow of the first case.

9. The computer program product of claim 8, wherein the set of matching tags is determined by a tag in the set of tags for the first case that matches a tag in the set of tags for the plurality of completed cases.

10. The computer program product of claim 8, wherein program instructions to create the first ordered list of the plurality of completed cases further comprises program instructions to prioritize an order by a tag type of the set of tag types for the number of matching tags in the set of matching tags in the tag type in the set of tags types.

11. The computer program product of claim 8, program instructions to generate a set of tags for a first case further comprises;

program instructions to extract from a received case content for the first case the set of tags wherein the set of tags include tags extracted from the first case include tags identifying case properties, tags extracted from case comments, and tags extracted from case documents; and program instructions to record a number of occurrences for each tag.

12. The computer program product of claim 9, wherein the case flow history includes at least one of a mandatory task and an optional task.

13. The computer program of claim 8, wherein the set of tag types includes at least a first tag type, a second tag type, and a third tag type:

wherein the tag types are at least one of a property type, a comment type, and a document type.

14. A computer system for dynamically providing a prioritized list of relevant cases, the computer system comprising:

one or more computer processors;

one or more computer readable storage media;

program instructions stored on the one or more computer readable storage media for execution by at least one of the one or more processors, the program instructions comprising:

program instructions to generate a set of tags for a first case;

program instructions to retrieve a set of tags for a plurality of completed cases;

program instructions to sort the set of tags for the first case and the set of tags for the plurality of completed cases into a set of tag types;

program instructions to determine a set of matching tags for each of the set of tag types between the first case and at least one of the plurality of completed cases;

program instructions to create, for a user, a first ordered list of the plurality of completed cases, wherein the first ordered list is based, at least in part, on:

a number of matching tags in the set of matching tags corresponding to the at least one completed case in the plurality of completed cases, and a number of matching tags in the set of matching tags in a tag type in the set of tag types;

program instructions to retrieve a case flow history for the first case and for each of the completed cases in the plurality of completed cases;

program instructions to compare the case flow history for the first case to the case flow history for each of the completed cases in the plurality of completed cases; and program instructions to create, for a user, a second ordered list of the plurality of completed cases based on the completed cases with a case flow most similar to the case flow of the first case.

15. The computer system of claim 14, wherein the set of matching tags is determined by a tag in the set of tags for the first case that matches a tag in the set of tags for the plurality of completed cases.

16. The computer system of claim 14, wherein program instructions to create the first ordered list of the plurality of completed cases further comprises program instructions to prioritize an order by a tag type of the set of tag types for the number of matching tags in the set of matching tags in the tag type in the set of tags types.

17. The computer system of claim 14, wherein the set of tag types includes at least a first tag type, a second tag type, and a third tag type:
wherein the tag types are at least one of a property type, a comment type, and a document type.

* * * * *